United States Patent Office 3,792,063
Patented Feb. 12, 1974

3,792,063
BIS CHROMONE-2-CARBOXYLIC ACIDS
Hugh Cairns and Dennis Hunter, Loughborough, England, assignors to Fisons Limited, Suffolk, England
No Drawing. Filed May 4, 1970, Ser. No. 34,586
Claims priority, application Great Britain, May 20, 1969, 25,556/69
Int. Cl. C07d 7/34
U.S. Cl. 260—345.2                     15 Claims

ABSTRACT OF THE DISCLOSURE

Bis chromone-2-carboxylic acids and pharmaceutically acceptable derivatives thereof in which the two chromone nuclei are linked by a group —$L^1LL^2$— in which $L^1$ is a methylene, carbonyl, carbonyloxy, —SO—, —$SO_2$— or —NH— group, or a sulphur or nitrogen atom, L is a linking group or bond, $L^2$ is an oxygen, sulphur or nitrogen atom or an —SO—, —$SO_2$— or an —NH— group. The compounds are indicated for use in the treatment of allergic asthma and processes for the production of the compounds are described.

The present invention relates to novel compounds, their preparations and use.

According to our invention we provide compounds of Formula I,

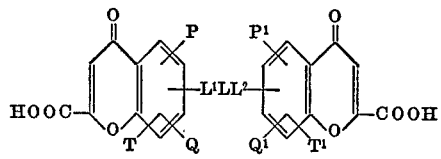

(I)

in which

P, Q, T, $P^1$, $Q^1$ and $T^1$, which may be the same or different, each represent hydrogen, or halogen, an alkyl group, an alkyl group carrying a halo, hydroxy, alkoxy, acetoxy, carboxy, alkoxycarbonyl, amino, alkylamino or a dialkylamino substituent, an unsaturated alkyl group, an aryl group, a nitro, hydroxy, amino, carboxyl, alkoxycarbonyl, alkoxy, hydroxyalkoxy, alkoxyalkoxy, carboxyalkoxy, haloalkoxy, aminoalkoxy, alkylaminoalkoxy, dialkylaminoalkoxy, unsaturated alkoxy, aralkoxy, aryloxy, alkylamino, alkoxycarbonylamino or carboxyamide group, an acyl group containing at least 2 carbon atoms or an alkoxy group interrupted by an oxygen atom which group may also carry a hydroxyl group, none of the above groups containing more than 10 carbon atoms, $L^1$ is a methylene, carbonyl, carbonyloxy, —SO—, —$SO_2$— or —NH— group, or a sulphur or nitrogen atom, L is a linking group or bond, $L^2$ is an oxygen, sulphur or nitrogen atom or an —SO—, —$SO_2$— or an —NH— group, and pharmaceutically acceptable derivatives thereof.

According to our invention we also provide a process for the production of a compound of Formula I or a pharmaceutically acceptable derivative thereof, which comprises (a) cyclizing a compound of Formula II,

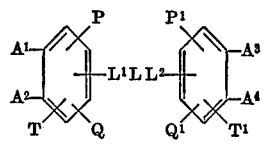

(II)

in which P, Q, T, $P^1$, $Q^1$, $T^1$, L, $L^1$ and $L^2$ are as defined above, and the pair of groups $A^1$, $A^2$ form the pairs of groups (i) —$COCH_2COCOR^6$ and —OM, or
(ii) —H and

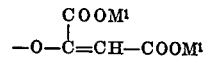

wherein $M^1$ is hydrogen or an alkali metal,
M is $M^1$ or an alkyl group, and
$R^6$ is an —OM group or a group convertible thereto, $A^3$ and $A^4$ form a pair of groups $A^1$, $A^2$ or a chain —CO—CH=C(COOH)—O—, and where necesssary in process (i) converting the group $R^6$ in the resulting compound to a group —OM, (b) dehydrogenating a compound of Formula V,

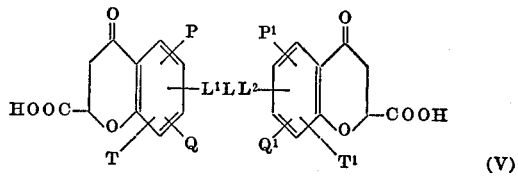

(V)

in which P, Q, T, $P^1$, $Q^1$, $T^1$, L, $L^1$ and $L^2$ are as defined above, (c) linking a compound of Formula III,

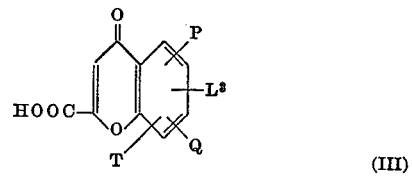

(III)

with a compound of Formula IV,

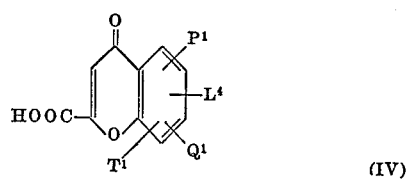

(IV)

in which formulae P, Q, T, $P^1$, $Q^1$ and $T^1$ are as defined above, and $L^3$ and $L^4$ are groups capable of reacting together to form an —$L^1LL^2$— linkage, or (d) hydrolyzing or oxidizing a compound of Formula VI,

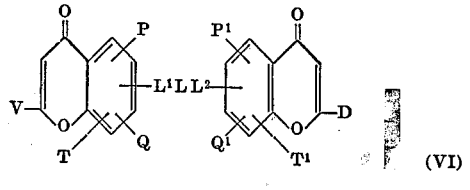

(VI)

in which P, Q, T, $P^1$, $Q^1$, $T^1$, $L^1$, L and $L^2$ are as defined above, D is an ester group or a group oxidizable to a —COOH group, and V is a group D or a —COOH group, under conditions which will not cleave the $L^1LL^2$ linkage, and where desired converting the resulting compound of Formula I to a pharmaceutically acceptable derivative thereof.

Process (a) is preferred and it is preferred that the pairs of groups $A^1$, $A^2$ and $A^3$, $A^4$ are the same.

The cyclization of process (a)(i), i.e. where $A^1$, $A^2$, represent —$COCH_2COCOR^6$ and —OM, may be carried out by heating the compound of Formula II directly, or preferably in an organic solvent, e.g. glycerol or dioxan and preferably ethanol. The cyclization may be carried out under neutral conditions or in the presence of an organic base, e.g. pyridine. The reaction is preferably carried out in the presence of an acidic cyclization agent, e.g. polyphosphoric, sulphuric, hydrochloric, acetic or toluene-p-sulphonic acid or a mixture thereof. Water may be present in the cyclization reaction mixture. When a compound in which M is an alkyl group is used, simultaneous cyclization and dealkylation may be achieved by use of HI or HBr as the cyclization agent. Cyclization may be carried out at a temperature of from about 15° C. to about 150° C., if desired under reflux. $R^6$ may, where necessary, be converted to a group OM either during the cyclization or by conventional techniques. $R^6$ is preferably an —O-alkyl group.

The cyclization of process (a)(ii), i.e. when $A^1$, $A^2$, represent —H and

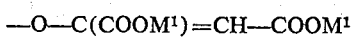

may be carried out by treating the compound of Formula II with a cyclizing agent at ambient temperature or above. Suitable cyclizing agents include dehydrating agents, concentrated acids, e.g. polyphosphoric acid, sulphuric acid, chlorosulphonic acid, and other Lewis acids. When a dehydrating agent is used the reaction is preferably carried out under anhydrous conditions and it is preferred to subject the compound of Formula II to a drying step before use.

Alternatively the process (a)(ii) may be effected by converting the —$COOM^1$ groups to acyl chloride groups, e.g. by treatment with $PCl_3$, $PCl_5$ or $SOCl_2$, and subjecting the resulting acyl chloride to an intramolecular Friedel-Crafts reaction.

The dehydrogenation of process (b) may be carried out by oxidation use of a dehydrogenation catalyst, or by halogenation followed by dehydrohalogenation. Dehydrogenation may be effected by, for example, the use of selenium dioxide, palladium black or chloranil. Alternatively the chromanone of Formula V may be halogenated using, for example, N-bromosuccinimide in an inert solvent, or pyridinium perbromide in an inert solvent, e.g. chloroform, in the presence of a free radical catalyst, e.g. benzoyl peroxide, followed by dehydro-bromination of the resulting 3-bromoderivative to yield the desired chromone compound.

Process (c) may be carried out in a variety of ways. Thus the linkages —$L^1LL^2$— between the chromone nuclei may be formed individually (this may, but need not be, the case where they or the units they link, are different) or be formed together, for example when the chromone nuclei and $L^1$ and $L^2$ are the same. The linkages may also be formed in a series of steps, for example two separate portions of the linkage may be built up progressively upon each chromone nucleus from smaller component portions and this is of especial application where the —$L^1LL^2$ group itself contains a linkage such as an ether, ester or ketone linkage.

For simplicity and since linkage at either end of the —$L^1LL^2$— group may be through different atoms, the description will be limited to the formation of the linkage with one end of the —$L^1LL^2$— group and the benzene ring in the compound of Formula III. It will however be appreciated that the linkage methods described below may be applied to the formation of linkages elsewhere in the molecule, for example, to the formation of linkages between one end of the —$L^1$— group and the —L— group, or to the formation of linkages such as ether, ester or ketone linkages within the linking group —$L^1LL^2$— itself. Moreover, since each of the linkages $L^1$, L and $L^2$ need not be the same, they may be formed at different times by different processes. Thus, it may prove desirable to introduce the group —$L^1$— into the starting material to give a compound of Formula IIIa,

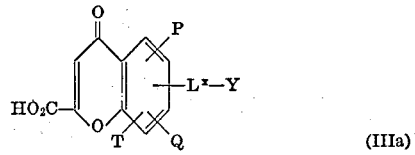

(IIIa)

in which

P, Q and T are as defined above, $L^x$ represents $L^1$,

Y represents a reactive group, or Y and $L^x$ together form a reactive precursor to an $L^1$ group, and then reacting the compound of Formula IIIa with a compound of Formula XI,

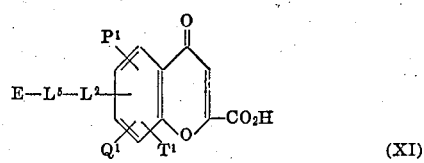

(XI)

in which $P^1$, $Q^1$, $T^1$ and $L^2$ are as defined above, $L^5$ is either an —L— group or with the residues of E and —$L^x$—Y forms an —$L^1L$— group, and E is a group reactive with the —$L^x$—Y group to form the desired —$L^1$— group.

Alternatively a compound of Formula IIIb,

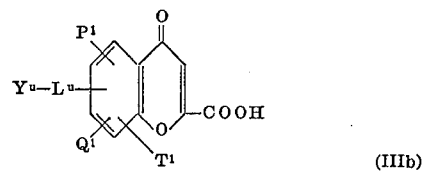

(IIIb)

in which $P^1$, $Q^1$ and $T^1$ are as defined above, $L^u$ represents $L^2$, $Y^u$ represents a reactive group, or $Y^u$ and $L^u$ together form a reactive precursor to an $L^2$ group, may be reacted with a compound of Formula XII,

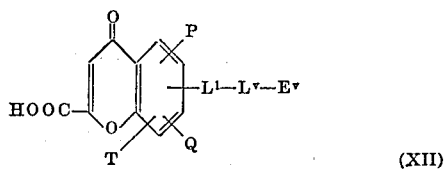

(XII)

in which

P, Q, T and $L^1$ are as defined above, $L^v$ is either an —L— group or with the residues of $E^v$ and —$L^u$—$Y^u$ forms an —$LL^2$— group, and $E^v$ is a group reactive with the —$L^u$—$Y^u$ group to form the desired —$L^2$— group.

The reactions involved in formation of the —$L^1LL^2$— linkage may be conventional reactions for forming the desired combination of groups. Thus, an ether linkage may be formed by the reaction of an OH group with an anion-forming or other group or function which reacts with an OH group to yield an ether linkage. Whilst it is preferred that the OH group be attached to the benzene ring (i.e. should be phenolic) this need not be the case. Suitable groups for reacting with the OH group include halogen (e.g. bromine or iodine), methane sulphonate or tosylate groups, epoxide groups or terminal ethylenic double bonds.

The ether linkage forming reaction may be carried out in the presence of alkali in water or in an organic solvent, such as acetone or dioxan, and at elevated temperatures. Where an anion-forming group is involved, the reaction may be carried out in the presence of an acid-binding agent, e.g. a carbonate, bicarbonate or alkoxide of sodium or potassium; or pyridine, diethylaniline or triethylamine. Where an epoxide group is involved, the reaction may be carried out in an organic solvent, e.g. dioxan, at an elevated temperature and in the presence of a catalyst such as a quaternary ammonium hydroxide. Where halogen is involved the reaction may be carried out in a solvent such as acetone and in the presence of freshly prepared silver oxide, or in the presence of an organic base or an acid-binding agent.

Where the —L— group is to be linked to the benzene ring through an atom other than oxygen, e.g. through an >NH group or a sulphur atom, such linkages may be formed in a manner analogous to that outlined above by using an anilino, amino, or mercapto substituted analogue of the phenol. The sulphur atom linkage formed in this way may be oxidized, e.g. with hydrogen peroxide, to yield an —SO— or —SO$_2$— linkage.

Where the linkage between the —L— group and the benzene ring is to be a composite linkage, e.g. in the case of a —NHCO—L—CONH— linkage, such a composite linkage may be formed by the appropriate modification of the methods outlined above, in this case by replacing the —OH group on a phenolic reactant with an —NH$_2$ group and reacting this with a compound ClCOLCOCl.

In many cases the groups $L^1$ and $L^2$ in the linkage —$L^1LL^2$— may be the same and, where this is the case, it is preferred to form each of these linkage groups using the same method in a single reaction stage. However where $L^1$ and $L^2$ or the benzene rings being linked are not the same, the use of a single reaction stage may not be possible and the overall linkage may have to be formed in two or more stages.

In process (d) the group D may be an alkyl or a substituted alkyl group, an acyl group, an alkenyl or ar alkenyl group or a simple ester group, for example derived from a C 1 to 5 alcohol. It is preferred that the group D should be an ester group or a methyl or styryl group. The oxidation or hydrolysis may be carried out using conventional techniques, but care should be taken to ensure that the reaction conditions do not cause opening of the chromone ring or hydrolysis of the —$L^1LL^2$— linkage.

Compounds of Formula II may be made by linking the appropriate mono benzenoid compounds using processes analogous to those described above for process (c) to form a compound of Formula XIII, $$W-\underset{T}{\underset{HO}{\bigodot}}\overset{P}{\underset{Q}{-}}L^1LL^2-\underset{T^1}{\underset{Q^1}{\bigodot}}\overset{P^1}{-}W$$
$$\phantom{W-}HO\phantom{xxxxxxxxxxxxxxxxxx}OH$$

(XIII)

in which

P, Q, T, $P^1$, $Q^1$, $T^1$, $L^1$, L and $L^2$ are as defined above, and

W is either a —COCH$_3$ group or hydrogen, and converting the compound of Formula XIII to a compound of Formula II using known techniques.

Compounds of Formula V may be made by cyclization of a compound of Formula XIV, $$MOOC-CH=CHOC-\underset{T}{\underset{M^1O}{\bigodot}}\overset{P}{\underset{Q}{-}}L^1LL^2-\underset{T^1}{\underset{Q^1}{\bigodot}}\overset{P^1}{-}COCH=CH-COOM$$
$$\phantom{MOOC-CH=CHOC-}M^1O\phantom{xxxxxxxxxxxx}OM^1$$

(XIV)

in which P, Q, T, $P^1$, $Q^1$, $T^1$, $L^1$, L, $L^2$, M and $M^1$ are as defined above, using conventional techniques. The compounds of Formula XIV may themselves be made from compounds of Formula XIII using conventional techniques.

Compounds of Formulae III and IV are either known compounds or may be made in a manner analogous to that known for the manufacture of the known compounds.

Compounds of Formula VI may be made in a manner analogous to process (a) above, but using a compound of Formula II in which the pair of groups $A^1$, $A^2$ are —COCH$_2$COD and —OM or are —H and an —O—CD=CHCOOM$^1$.

The compounds of Formula I and the intermediates therefor may be recovered and purified using techniques conventional in the recovery and purification of similar known compounds.

The process outlined above may produce the free acids of Formula I or may yield derivatives thereof. It is also within the scope of the present invention to treat the product of any of the above processes, after any isolation and purification steps that may be desired, in order to liberate the free acid therefrom or to convert one form of derivative into another. The methods used to isolate and purify any product may be those conventionally used. Thus, salts may be prepared by the use of alkaline conditions during the recovery and purification of the compound. Alternatively, the free acid may be obtained and subsequently converted to a desired salt by neutralization with an appropriate base, e.g. an organic amine, or an alkali such as an alkali-metal or alkaline-earth metal hydroxide, carbonate or bicarbonate, preferably a mild base or alkali such as sodium carbonate or bicarbonate. Where the compound is recovered in the form of a salt, this salt may be converted to a more desirable salt, for example by a metathetical process. The esters may be obtained as a result of having used appropriate starting materials; may be formed by the reaction of an appropriate alcohol; alkyl sulphate or halo-compound with free carboxyl groups in the compound of Formula I; or may be formed by the reaction of an appropriate alcohol with an acyl halide of the compound of Formula I. Alternatively, transesterification techniques may be used to exchange one ester group for another. The amides may be readily obtained, for example, by dehydration of the ammonium salt or by reaction of an ester or acyl halide with an appropriate amino compound such as ammonium hydroxide or a primary or secondary amine or an amino acid. Alternatively, the free acid of Formula I may be condensed with an alkyl haloformate (e.g. chloroformate) in the presence of an organic base such as triethylamine, to yield a mixed anhydride which is then treated with an aminoacid or ester thereof in the presence of a suitable solvent to give an N-carboxyalkyl substituted amide. The mixed anhydride need not be isolated from the reaction mixture in which it was prepared, but may be treated in situ.

Pharmaceutically acceptable derivatives of the compounds of Formula I include pharmaceutically acceptable salts (notably water soluble salts), esters and amides of one or more of the 2-carboxylic acid groups. Suitable salts include ammonium salts, alkali metal salts (e.g. sodium potassium and lithium salts), alkaline earth metal salts (e.g. magnesium and calcium salts); and salts with organic bases, e.g. amine salts derived from mono-, di- or tri-lower alkyl or lower alkanolamines (such as triethanolamine or triethylamine) and salts with heterocyclic amines such as piperidine or pyridine.

Esters which may be mentioned include simple alkyl esters derived from alcohols containing from 1 to 10 carbon atoms (e.g. a methyl, ethyl, propyl, or pentyl ester) and alkylaminoalkyl esters, such as those of the general formula —COO—$R^{11}$—NR$^{111}$R$^{1111}$ wherein $R^{11}$ is a branched or straight alkylene chain (e.g. one containing from 1 to 4 carbon atoms such as methylene, ethylene, propylene, isopropylene or tert. butylene group); and $R^{111}$ and $R^{1111}$ may be the same or different and each is selected from hydrogen or an alkyl group (e.g. a lower alkyl group such as a methyl, ethyl, propyl or butyl group) or together with the nitrogen atom form an heterocyclic ring such as a piperidine or morpholine ring. Examples of such basic esters are diethylaminoethyl and piperidinoethyl esters. The basic esters may be in the form of a physiologically acceptable acid addition salt thereof, e.g. the hydrochloric acid salt.

Amides which may be mentioned include simple amides derived from ammonia or primary or secondary aliphatic or aromatic amines, such as mono- or di-lower alkyl amines (for example diethylamine), aniline or a monoalkylaniline such as N-methyl aniline; and more complex amides derived from amino acids such as glycine, i.e. amides of the formula —$CONR^x$—$R^{11}$—COOH, or salts and esters thereof, and from mono- or bis-(dialkylaminoalkyl) amines, i.e. amides of the formula

—$CONR^x$—$R^{11}N$—$R^{111}R^{1111}$ wherein $R^x$ is hydrogen or an alkyl group (e.g. a lower alkyl group such as a methyl, ethyl, propyl or butyl group) and $R^{11}$, $R^{111}$ and $R^{1111}$ have the values given above. The amides may exist in the form of a physiologically acceptable acid addition salt thereof, e.g. an hydrochloride.

Preferred pharmaceutically acceptable derivatives of the compounds of Formula I are the sodium and ammonium salts, the alkyl, dialkylamino-alkyl and piperidinoethyl esters where the alkyl groups contain from 1 to 6 carbon atoms, e.g. ethyl groups, and amides derived from ammonia, aminoacids, e.g. glycine, and dialkylaminoalkyl amines, e.g. diethyl aminoethylamine.

The new compounds of Formula I and pharmaceutically acceptable derivatives thereof are useful because they have pharmocological properties. In particular they inhibit the release of toxic products which arise from the combination of certain types of antibody and specific antigen, e.g. the combination of reaginic antibody with specific antigen. In man, both subjective and objective changes which result from the inhalation of specific antigen by sensitized subjects may be markedly inhibited by administration of the new compounds. Thus, the new compounds are indicated for use in the treatment of "extrinsic" allergic asthma. The new compounds may also be of value in the treatment of so-called "intrinsic" asthma (in which no sensitivity to extrinsic antigen can be demonstrated) and in the treatment of other conditions in which antigen-antibody reactions are responsible for disease, for example, hay fever, urticaria and autoimmune diseases.

According to a further feature of the invention there is provided a pharmaceutical composition comprising a compound of Formula I, or a pharmaceutically acceptable derivative thereof, preferably in the form of a salt, in association with a pharmaceutically acceptable carrier or diluent. There is also provided a process for the manufacture of such a pharmaceutical composition which comprises mixing a compound of Formula I or a pharmaceutically acceptable derivative thereof, with a pharmaceutically acceptable carrier or diluent.

For the sake of simplicity the pharmaceutical compositions will be described with respect to the compounds of Formula I only, but pharmaceutically acceptable derivatives thereof are to be understood to be included.

The nature of the composition and the pharmaceutically acceptable carrier or diluent will, of course, depend upon the desired mode of administration, which may be for example, orally; by inhalation; parenterally; or by topical application.

The composition may be formulated in the conventional manner with the customary ingredients. For example, the compositions may be put up as aqueous solutions or suspensions, as powders or in tablet, cream, lotion or syrup form.

The compositions of the invention generally comprise a minor proportion of the compound of Formula I and a major proportion of carrier or diluent. Thus, for example, aqueous solutions for administration by means of a conventional nebulizer may contain up to about 10% by weight of the active ingredient in sterile water; and compositions for dispensing from a pressurized container comprising suspensions or solutions in liquefied propellants may contain, for example, about 0.2-5% by weight of the active ingredient.

The compounds of Formula I are preferably administered by inhalation, notably in the treatment of allergic asthma. For such use, the compounds of Formula I preferably in the form of a salt, e.g. the sodium salt, may be dissolved or suspended in water and may be applied by means of a conventional nebulizer. However the administration of the compounds of Formula I by means of a conventional aerosol dispenser, is an alternative to nebulizer administration. Typical propellants suitable for use in the aerosol are those disclosed in U.S. Pat. No. 2,868,691 and sold under the trade name of Freon. The propellant should of course be of low toxicity, especially where the composition is to be ingested, e.g. inhaled, by the user. Where the compound of Formula I is not soluble in the propellant, it may be necessary to add a surface-active agent, and preferably an anionic surface-active agent, to the composition in order to suspend the compound of Formula I in the propellant medium, and such surface-active agents may be any of those used for a similar purpose. The use of anionic surface-active agents in similar compositions is more fully described in British patent specification No. 1,063,512.

The compositions of the invention may also be administered in the form of powders by means of an insufflator device, e.g. that described in British patent specification No. 1,122,284. In order to improve the properties of the powder, it may be desired to modify the surface characteristics of the powder particles, for example, by coating them with a pharmaceutically acceptable material such as sodium stearate. In addition, fine particle sized powders of the active ingredients may be mixed with a coarser diluent material, such as lactose, which may be present in a smaller, equal or greater amount than the active ingredients, for example in from 50 to 150% by weight of the compound of Formula I and such other active ingredients as may be present.

Whilst the inhalation of medicament has been described above with particular reference to oral administration, it will be appreciated that it may be desirable to administer the medicament nasally. The term inhalation is therefore used herein to denote, where the context permits, tracheal administration either through the nose or mouth.

The composition of the invention may also be administered as tablets, syrups and the like or by intradermal or intravenous injection in the conventional manner.

In addition to the internal administration, the compounds of Formula I find used in compositions for topical application e.g. as creams, lotions or pastes for use in dermatological treatments.

In addition to the compound of Formula I and the ingredients required to present the compound in a form suitable for the selected mode of administration, other active ingredients may be present in the composition of the invention. Thus, in compositions for administration by inhalation, it may be beneficial to include a bronchodilator. Any bronchodilator may, within reason, be used. Suitable bronchodilators include isoprenaline, adrenaline, orciprenaline, isoetharine and derivatives thereof. The use of isoprenaline sulphate is preferred. The amount of bronchodilator used will vary over a broad range, depending, inter alia, upon the nature and activity of the bronchodilator and the compound of Formula I used. The use of a minor proportion (i.e. less than 50% by weight), and preferably of from 0.1 to 10% by weight of the bronchodilator based on the weight of the compound of Formula I is desirable.

As indicated above, the compounds of Formula I are indicated for use in inhibiting the effects of antibody-antigen reactions. In such treatment, the compound or composition of the invention is administered by the chosen method to the side of the antibody-antigen reaction in the therapeutically effective amount. The treatment may be one which requires repeated dosages of the medicament at regular intervals. The amount and frequency of medicament administered will depend upon many factors and no concise dosage rate or regimen can be generally stated. However, as a general guide, where the compounds are administered by inhalation to a patient suffering from acute allergic asthma, useful results may be achieved when the compounds are administered at a dosage of 0.1 to 50 mgs. Where the compounds are administered by the oral (oesophagal) route, larger dosages may be given.

Preferred compounds of Formula I are those in which $L^1$ is a methylene, a carbonyloxy group or, in particular, an —NH— group. It is also preferred that $L^2$ is an oxygen atom or more preferably an —NH— group. It is further preferred that $L^1$ be the same as $L^2$.

The L group may be carbocyclic or heterocyclic ring, or a saturated or unsaturated, straight or branched, substituted or unsubstituted hydrocarbon chain which may be interrupted by an $L^1$ or $L^2$ group. Specific examples of the L group include carbocyclic rings such as benzene, or cyclohexane rings; heterocyclic rings such as pyridine, piperidine, piperazine rings. L may also be a chain such as:

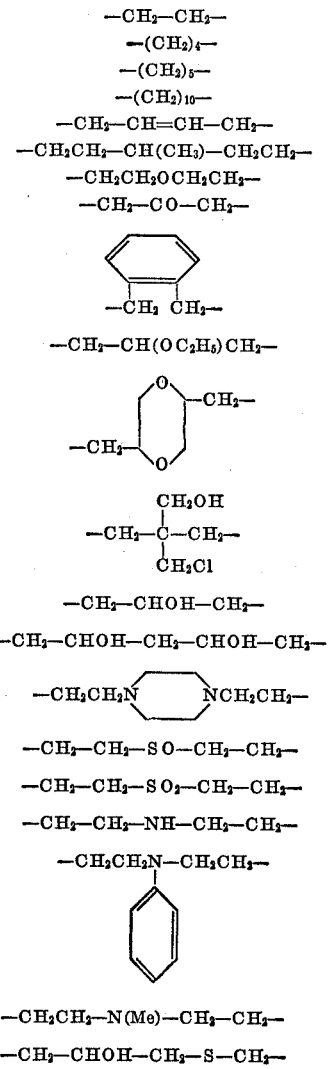

In addition to the above examples of hydrocarbons chains which are interrupted by an $L^1$ group or oxygen, either or both of the terminal groups of the above chains may be replaced by a carbonyl group when $L^1$ and $L^2$ are both —NH—groups. Thus, in a preferred feature of our inventions, the —$L^1LL^2$ chain may be of the formula —NHCO$(CH_2)_m$CONH— wherein $m$ has a value of from 0 to 10.

Alternatively, the group L may merely be a bond between the two groups $L^1$ and $L^2$, for example when the —$L^1LL^2$— chain is an NHCO—, —S—S— or —OCH$_2$— group, or a double bond as in the case where the chain is —N=N—. L may also be a single atom linkage, e.g. a —CH$_2$— or a —CO— group.

However, it is particularly preferred that the group —L— be a saturated or unsaturated straight or branched polymethylene chain which may carry one or more halogen or hydroxyl substituents and may have any carbon atom in the chain thereof replaced by one or more carbonyl groups or oxygen atoms. Examples of such polymethylene chains include the groups —CH$_2$CHOHCH$_2$— and —(CH$_2)_p$— where $p$ has a value of from 1 to 10 preferably 2 to 8.

The chain —$L^1LL^2$— may be bonded to any of the free positions on each of the chromone nuclei. Moreover, it is not necessary that the bonding position be the same on each nucleus. It is preferred that bonding take place upon similar positions on each nucleus, notably upon the 6 and $6^1$ or 7 and $7^1$ positions.

Preferred compounds of Formula I are those wherein P to $T^1$ are hydrogen, chlorine, bromine, iodine, hydroxy, carboxy, alkoxycarbonyl, nitro, amino, alkyl, alkenyl, alkynyl, phenyl, alkoxy, alkenyloxy, alkynyloxy, aryloxy, aralkoxy or acyl groups and such groups carrying as substituents, halogen, hydroxy, or alkoxy groups. Particularly preferred compounds are those wherein P to $T^1$ are hydrogen, chlorine, bromine, nitro, amino, or lower alkyl, alkenyl, alkoxy or alkenyloxy groups containing from 1 to 6 carbon atoms which may carry one or more hydroxy, lower alkoxy and/or aryl substituents.

In general it is preferred that not more than one of P, Q and T, and not more than one of $P^1$, $Q^1$ and $T^1$ is other than hydrogen.

It will be appreciated that certain of the above values for P to $T^1$ include groups which might be detrimentally affected by the reactants and/or reaction conditions used to introduce other groups into the molecule. In such cases the affected group or site may be blocked or shielded during the reaction.

A specific group of compounds of Formula I are those in which P to $T^1$ are all hydrogen, or one of them is lower alkoxy, $L^1$ and $L^2$ are both —NH— groups, L is a group —CO(CH$_2)_m$CO— in which $m$ is from 0 to 10 and the two chromone nuclei are linked through the 6,$6^1$ or 7,$7^1$ positions.

The invention is illustrated by the following examples in which all parts and percentages are given by weight unless otherwise stated:

EXAMPLE I

N,N'-bis(2-carboxychromon-7-yl) adipamide (a) N,N'-bis(4-acetyl-3-hydroxyphenyl) adipamide.—
A mixture of 1.37 parts of 4-amino-2-hydroxyacetophenone and 0.44 part of pyridine in 30 parts of chloroform was treated with a solution of 0.53 part of adipyl chloride in 10 parts of chloroform. The mixture was heated under reflux for 2 hours, cooled and filtered.

The solid was boiled with 60 parts of dioxan and the insoluble material was filtered off and dried to give 0.8 part of N,N'-bis(4-acetyl-3-hydroxyphenyl) adipamide as a pink solid, melting point 273° C. (d.).

Analysis.—$C_{22}H_{24}N_2O_6$ requires (percent): C, 64.06; H, 5.87; N, 6.79. Found (percent): C, 64.1; H, 5.52; N, 6.63.

(b) N,N' - bis(2-carboxychromon-7-yl) adipamide trihydrate.—To a stirred solution of sodium ethoxide in dry ethanol, prepared from 0.7 part of sodium and 20 parts of dry ethanol, was added a slurry of 1.55 parts of N,N'-bis(4-acetyl-3-hydroxyphenyl) adipamide and 2.75 parts of diethyl oxalate in 30 parts of dry ethanol. The mixture was stirred and heated under reflux for 4 hours.

The mixture was cooled, then poured into a separating funnel containing dilute hydrochloric acid and ethyl acetate. The ethyl acetate layer was separated, dried over sodium sulphate and evaporated to dryness to leave a brown oil.

This oil was dissolved in hot ethanol containing 0.5 part of concentrated hydrochloric acid. The solution was heated under reflux for 20 minutes then cooled, whence a buff solid crystallized out. This solid was dissolved in aqueous sodium bicarbonate solution, with heating. Acidification of the bicarbonate solution gave 0.75 part of N,N' - bis-(2-carboxychromon-7-yl) adipamide trihydrate as a buff solid, melting point 280° C. (d).

Analysis.—$C_{26}H_2N_{20}O_{10} \cdot 3H_2O$ requires (percent): C, 54.36; H, 4.53; N, 4.89. Found (percent): C, 54.5; H, 4.38; N, 5.17.

(c) N,N' - bis(2-carboxychromon-7-yl) adipamide disodium salt.—A solution of 0.63 part of N,N'-bis(2-carboxychromon-7-yl) adipamide trihydrate and 0.18 part of sodium bicarbonate in 50 parts of water was treated with charcoal, filtered and freeze-dried to give 0.63 part of N,N'-bis(2-carboxychromon-7 - yl) adipamide disodium salt as a buff solid.

EXAMPLE II

N,N'-bis(2-carboxychromon-7-yl) oxamide (a) N,N' - bis(4-acetyl-3-hydroxyphenyl) oxamide.—By the method of Example I(a) 3.01 parts of 4-amino-2-hydroxyacetophenone were treated with 1.27 parts of oxalyl chloride to give 1.7 parts of N,N'-bis(4-acetyl-3-hydroxyphenyl) oxamide as a pink solid, melting point 335° C. (d.).

Analysis.—$C_{18}H_{16}N_2O_6$ requires (percent): C, 60.67; H, 4.53; N, 7.86. Found (percent): C, 59.87; H, 4.37; N, 7.62.

(b) N,N'-bis(2-carboxychromon-7-yl) oxamide trihydrate.—By the method of Example I(b) 1.5 parts of N,N'-bis(4-acetyl-3-hydroxyphenyl) oxamide were treated with 3.1 parts of diethyl oxalate to give 0.22 part of N,N'-bis-(2-carboxychromon-7-yl) oxamide trihydrate as a yellow solid, melting point 200–2° C. (d.).

Analysis.—$C_{22}H_{12}N_2O_{10} \cdot 3H_2O$ requires (percent): C, 50.96; H, 3.48; N, 5.41. Found (percent): C, 50.27; H, 3.4; N, 5.5.

(c) N,N' - bis(2-carboxychromon-7-yl) oxamide disodium salt.—A solution of 0.16 part of N,N'-bis(2-carboxychromon-7-yl) oxamide trihydrate and 0.052 part of sodium bicarbonate in 30 parts of water was freeze dried to give 0.16 part of N,N'-bis(2-carboxychromon-7-yl) oxamide disodium salt as a yellow solid.

EXAMPLE III

N,N'-bis(2-carboxychromon-6-yl) succinamide (a) N,N' - bis(3 - acetyl - 4 - hydroxyphenyl) succinamide.—By the methods of Example I(a), 1.51 parts of 5-amino-2-hydroxyacetophenone were treated with 0.8 part of succinoyl chloride to give 0.42 part of N,N'-bis(3-acetyl-4-hydroxyphenyl) succinamide as buff needles, melting point 267–8° C., from ethanol-dioxan.

Analysis.—$C_{20}H_{20}N_2O_6$ requires (percent): C, 62.49; H, 5.24; N, 7.29. Found (percent): C, 61.97; H, 5.28; N, 7.19.

(b) N,N' - bis(2 - ethoxycarbonylchromon - 6 - yl) succinamide.—To a stirred solution of sodium ethoxide in dry ethanol prepared from 1.67 parts of sodium in 50 parts of dry ethanol, was added a slurry of 3.5 parts of N,N'-bis(3-acetyl-4-hydroxyphenyl) succinamide and 6 parts of diethyl oxalate in 50 parts of dry ethanol. The mixture was stirred and heated under reflux for 4 hours.

The reaction mixture was then cooled and poured into a separating funnel containing a mixture of dilute hydrochloric acid and ethyl acetate. The ethyl acetate layer was separated, dried over sodium sulphate and evaporated to leave a brown oil. This oil was dissolved in hot ethanol containing 0.5 part of concentrated hydrochloric acid. The solution was boiled for 20 minutes then cooled, whence 1.45 parts of N,N' - bis(2-ethoxycarbonylchromon-6-yl) succinamide crystallized as a yellow solid, melting point >330° C.

Analysis.—$C_2H_{24}N_2O_{10}$ requires (percent): C, 61.3; H, 4.41; N, 5.11. Found (percent): C, 60.6; H, 4.39; N. 5.05.

(c) N,N' - bis(2 - carboxychromon-6-yl) succinamide dihydrate.—A mixture of 1.1 parts of N,N'-bis(2-ethoxycarbonylchromon-6-yl) succinamide and 0.3 part of sodium bicarbonate in water ad dioxan was stirred and heated on a steam-bath till solution was complete. The solution was then cooled and acidified with concentrated hydrochloric acid to give a gelatinous precipitate.

This solid was obtained by centrifuging decanting the liquid mixing the gel with ethanol, recentrifuging, decanting the ethanol and finally adding diethyl ether and filtering.

The solid was dried to give 0.55 part of N,N'-bis(2-carboxychromon-6-yl) succinamide dihydrate as a pale green solid, melting point 270° C. (d.).

Analysis.—$C_{24}H_{16}N_2O_{10}2H_2O$ requires (percent): C, 54.55; H, 3.82; N, 5.3. Found (percent): C, 54.8; H, 3.53; N, 5.2.

(d) N,N' - bis(2 - carboxychromon-6-yl) succinamide disodium salt.—A solution of 0.467 part of N,N'-bis(2-carboxychromon-6-yl) succinamide dihydrate and 0.148 part of sodium bicarbonate in 50 parts of water was treated with charcoal, filtered and freeze-dried to give 0.46 part of N,N'-bis(2-carboxychromon-6-yl) succinamide disodium salt as a buff solid.

EXAMPLES IV

N,N'-bis(2-carboxychromon-6-yl) adipamide (a) N,N' - bis(3 - acetyl - 4 - hydroxyphenyl) adipamide.—By the method of Example I(a), 2.8 parts of 5-amino-2-hydroxyacetophenone were treated with 1.0 part of adipyl chloride to give 2.0 parts of N,N'-bis(3-acetyl-4-hydroxyphenyl) adipamide as buff needles, melting point 254° C., from acetic acid.

Analysis.—$C_{22}H_{24}N_2O_6$ requires (percent): C, 64.06; H, 5.87; N, 6.79. Found (percent): C, 64.6; H, 5.97; N, 6.80.

(b) N,N' - bis(2 - ethoxycarbonyl chromon-6-yl) adipamide.—By the method of Example III(b), 2.7 parts of N,N' - bis(3 - acetyl - 4-hydroxyphenyl) adipamide were treated with 5.0 parts of diethyl oxalate to give 2.2 parts of N,N'-bis(2-ethoxycarbonylchromon-6-yl) adipamide as a pale yellow solid, melting point 297–8° C.

Analysis.—$C_{30}H_{28}N_2O_{10}$ requires (percent): C, 62.49; H, 4.9; N, 4.86. Found (percent): C, 61.9; H, 5.06; N, 4.7.

(c) N,N'-bis(2-carboxychromon-6-yl) adipamide dihydrate.—By the method of Example III(c), 1.1 parts of N,N' - bis(2 - ethoxycarbonylchromon - 6 - yl) adipamide were treated with 1.0 part of sodium bicarbonate to give 1.0 part of N,N'-bis(2-carboxychromon-6-yl) adipamide dihydrate as yellow solid of indefinite melting point.

Analysis.—$C_{26}H_{20}N_2O_{10}2H_2O$ requires (percent): C, 56.12; H, 4.32; N, 5.04. Found (percent): C, 56.3; H, 4.56; N, 5.03.

(d) N,N'-bis(2-carboxychromon-6-yl) adipamide disodium salt.—A solution of 0.92 part of N,N'-bis(2-carboxychromon-6-yl) adipamide dihydrate and 0.28 part of sodium bicarbonate in 70 parts of water was freeze-dried to give 0.9 part of N,N'-bis(2-carboxychromon-6-yl) adipamide disodium salt as a colorless solid.

EXAMPLE V

N,N'-bis(2-carboxychromon-6-yl) sebacamide (a) N,N'-bis(3-acetyl-4-hydroxyphenyl) sebacamide.—By the method of Example 1(a) 3.02 parts of 5-amino-2-hydroxyacetophenone were treated with 2.39 parts of sebacoyl chloride to give 1.90 parts of N,N'-bis(3-acetyl-4-hydroxyphenyl) sebacamide as a yellow solid, melting point 210–13° C.

Analysis.—$C_{26}H_{32}N_2O_6$ requires (percent): C, 66.65; H, 6.88; N, 5.98. Found (percent): C, 66.5; H, 6.83; N, 5.92.

(b) N,N'-bis(2-ethoxycarbonylchromon-6-yl) sebacamide.—By the method of Example III(b), 2.34 parts of N,N'-bis(3-acetyl-4-hydroxyphenyl) sebacamide were treated with 3.7 parts of diethyl oxalate to give 2.28 parts of N,N'-bis(2-ethoxycarbonylchromon-6-yl) sebacamide as yellow needles, melting point 243–7° C., from ethanol.

Analysis.—$C_{34}H_{36}N_2O_{10}$ requires (percent): C, 64.5; H, 5.78; N, 4.43. Found (percent): C, 64.2; H, 5.93; N, 4.69.

(c) N,N'-bis(2-carboxychromon-6-yl) sebacamide monohydrate.—To a solution of 3.0 parts of sodium bicarbonate in 400 parts of water was added 1.74 parts of N,N'-bis(2-ethoxycarbonylchromon-6-yl) sebacamide. The mixture was stirred and heated on a steam bath for 2 hours. The hot solution was filtered and the filtrate was acidified with dilute hydrochloric acid. The precipitate was filtered, washed with water and dried to give 0.95 part of N,N'-bis(2-carboxychromon-6-yl) sebacamide monohydrate as a yellow solid, melting point 261–4° C. (decomposition).

Analysis.—$C_{30}H_{28}N_2O_{10}H_2O$ requires (percent): C, 60.6; H, 5.09; N, 4.71. Found (percent): C, 60.0; H, 5.31; N, 4.76.

(d) N,N'-bis(2-carboxychromon-6-yl) sebacamide disodium salt.—A solution of 0.184 part of sodium bicarbonate and 0.652 part of N,N'-bis(2-carboxychromon-6-yl) sebacamide monohydrate in 200 parts of water was freeze dried to give 0.6 part of N,N'-bis(2-carboxychromon-6-yl) sebacamide disodium salt as a cream colored solid.

EXAMPLE VI

N,N'-bis(2-carboxyl-7-methoxychromon-6-yl) sebacamide (a) N,N'-bis(5-acetyl-4-hydroxy-2-methoxyphenyl) sebacamide.—By the method of Example 1(a) 6.0 parts of 5-amino-2-hydroxy-4-methoxyacetophenone were treated with 3.95 parts of sebacoyl chloride to give 5.3 parts of N,N'-bis(5-acetyl-4-hydroxy-2-methoxyphenyl) sebacamide as a yellow solid, melting point 184–5° C.

Analysis.—$C_{28}H_{36}N_2O_8$ requires (percent): C, 63.62; H, 6.87; N, 5.30. Found (percent): C, 63.5; H, 6.86; N, 5.30.

(b) N,N'-bis(2-carboxy-7-methoxychromon-6-yl) sebacamide trihydrate.—By the method of Example I(b) 3.18 parts of N,N'-bis(5-acetyl-4-hydroxy-2-methoxyphenyl) sebacamide were treated with 4.4 parts of diethyl oxalate to give 0.4 part of N,N'-bis(2-carboxyl-7-methoxychromon-6-yl) sebacamide trihydrate as a buff colored solid, melting point 190° C. (d.).

Analysis.—$C_{32}H_{32}N_2O_{12} \cdot 3H_2O$ requires (percent): C, 55.6; H, 5.52; N, 4.06. Found (percent): C, 55.8; H, 5.15; N, 4.12.

(c) N,N'-bis(2-carboxy-7-methoxychromon-6-yl) sebacamide disodium salt.—A solution of 0.35 part of N,N'-bis(2-carboxy-7-methoxychromon-6-yl) sebacamide trihydrate and 0.093 part of sodium bicarbonate in 30 parts of water was freeze-dried to give 0.30 part of N,N'-bis(2-carboxy-7-methoxychromon-6-yl) sebacamide disodium salt as a cream colored solid.

EXAMPLE A

The compounds set out in Table I below were tested to assess their effectiveness in inhibiting antibody-antigen reactions.

In these tests, the effectiveness of the compounds of the invention in inhibiting the passive cutaneous anaphylaxis in rats was assessed. It has been proved that this form of test gives reliable qualitative indications of the ability of the compounds under test to inhibit antibody-antigen reactions in man.

In this test method Sprague-Dawley rats (male or female) having a body weight of from 100 to 150 gms. were infected by subcutaneous inoculation at weekly intervals with *N. braziliensis* larvae in doses increasing from about 2000 larvae per animal to 12,000 larvae per animal in order to establish the infection in the rats. After 8 weeks the rats were bled by heart puncture and 12–20 mls. of blood collected from each animal. The blood samples were then centrifuged at 3500 r.p.m. for 30 minutes in order to obtain serum containing the antibody to *N. braziliensis*.

A pilot sensitivity test was carried out to determine the least quantity of serum required to give a skin weal, in control animals in the test described below, of 2 cm. diameter. It was found that with rats in the body weight range 100–130 gms. serum diluted 1:8 with physiological saline solution gave satisfactory reactions. This diluted solution was called antibody serum A.

The antigen to react with the antibody in serum A was prepared by removing worms from the gut of the infected rats, homogenizing the worms, centrifuging the homogenate and collecting the supernatant liquor. This liquor was diluted with physiological saline to give a protein content of 10 milligrams/ml. and was known as serum B.

Sprague-Dawley rats in the body weight range 100 to 130 gms. were sensitized by intradermal injection of 0.1 ml. of serum A into the right flank. Sensitivity was allowed to develop for 24 hours and the rats were then injected intravenously with 1 ml./100 gms. body weight of a mixture of serum B (0.25 ml.), Evans Blue dye solution (0.25 ml.) and the solution of the compound under test (0.5 ml. of varying concentrations). Insoluble compounds were administered as a separate intraperitoneal injection 5 minutes before intravenous administration of serum B and Evans Blue dye. For each concentration of the compound under test five rats were injected. Five rats were used as controls in each test. The dosages of the compound under test were selected so as to give a range of inhibition values.

Thirty minutes after injection of serum B the rats were killed and the skins removed and reversed. The intensity of the anaphylactic reaction was assessed by comparing the size of the characteristic blue weal produced by spread of the Evans Blue dye from the sensitization site with the size of the weal in the control animals (20 mm. diameter weal). The size of the weal was rated as 0 (no weal detected, i.e. 100% inhibition) to 4 (no difference in size of weal, i.e. no inhibition) and the percentage inhibition for each dose level calculated as:

Percent inhibition $$= \frac{(\text{Control group score} - \text{treated group score}) \times 100}{\text{Control group score}}$$

The percentage inhibitions for the various dose levels were plotted graphically for each compound. From these graphs the dosage required to achieve a 50% inhibition of the analphylactic reaction ($ID_{50}$) may be determined. These results are tabulated in Table I.

TABLE I

| Name of compound tested (in form of disodium salt) | ID$_{50}$ in mgs./kg. of the disodium salt |
|---|---|
| N,N'-bis(2-carboxychromon-7-yl) adipamide | 8.8 |
| N,N'-bis(2-carboxychromon-7-yl) oxamide | 1.25 |
| N,N' - bis(2 - carboxychromon - 6 - yl) succinamide | 0.52 |
| N,N'-bis(2-carboxychromon-6-yl) adipamide | 5.0 |
| N,N'-bis(2-carboxychromon-6-yl) sebacamide | 1.0 |
| N,N$^1$-bis(2-carboxy-7-methoxy chromone-6-yl) sebacamide | 5.8 |

We claim:
1. A compound of Formula I,

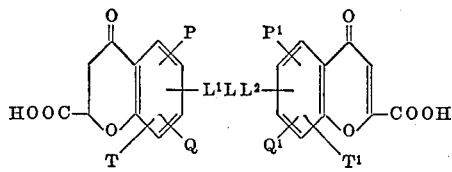

in which P, Q, T, P$^1$, Q$^1$ and T$^1$, which may be the same or different, each represent hydrogen, halogen, alkyl, alkyl carrying a halo, hydroxy, alkoxy, acetoxy, carboxy, alkoxycarbonyl, amino, alkylamino or a dialkylamino substitutent, alkenyl, phenyl, nitro, hydroxy, amino, carboxyl, alkoxycarbonyl, alkoxy, hydroxyalkoxy, alkoxyalkoxy, carboxyalkoxy, haloalkoxy, aminoalkoxy, alkylaminoalkoxy, dialkylaminoalkoxy, alkenyloxy, alkylamino, alkoxycarbonylamino or carboxyamide, alkanoyl containing at least 2 carbon atoms or an alkoxy group interrupted by an oxygen atom which group may also carry a hydroxyl group, none of the above groups containing more than 10 carbon atoms, L$^1$ is methylene, carbonyl, carbonyloxy, —SO—, —SO$_2$—, —NH—, sulphur or nitrogen, L is selected from the group consisting of:
 (a) the divalent radical of benzene, cyclohexane, pyridine, piperidine, or piperazine, and
 (b) a member selected from the following alkylene chain structures:

—(CH$_2$)p—

—CH$_2$—CH=CH—CH$_2$—

—CH$_2$CH$_2$—CH(CH$_3$)—CH$_2$CH$_2$—

—CH$_2$CH$_2$O CH$_2$ CH$_2$—

—CH$_2$—CO—CH$_2$—

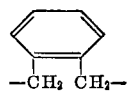

—CH$_2$—CH(OC$_2$H$_5$)CH$_2$—

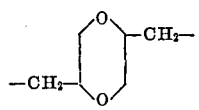

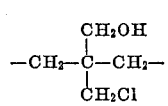

—CH$_2$—CHOH—CH$_2$—

—CH$_2$—CHOH—CH$_2$—CHOH—CH$_2$—

—CH$_2$CH$_2$N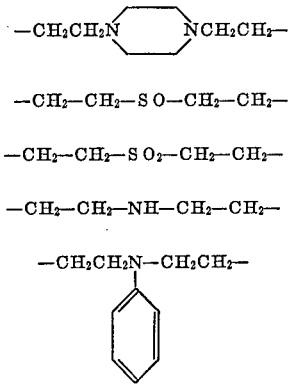NCH$_2$CH$_2$—

—CH$_2$—CH$_2$—S O—CH$_2$—CH$_2$—

—CH$_2$—CH$_2$—S O$_2$—CH$_2$—CH$_2$—

—CH$_2$—CH$_2$—NH—CH$_2$—CH$_2$—

—CH$_2$CH$_2$N—CH$_2$CH$_2$—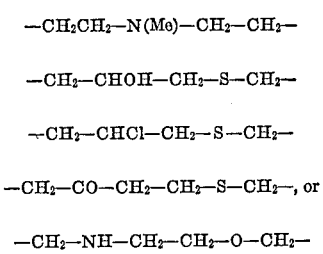

—CH$_2$CH$_2$—N(Me)—CH$_2$—CH$_2$—

—CH$_2$—CHOH—CH$_2$—S—CH$_2$—

—CH$_2$—CHCl—CH$_2$—S—CH$_2$—

—CH$_2$—CO—CH$_2$—CH$_2$—S—CH$_2$—, or

—CH$_2$—NH—CH$_2$—CH$_2$—O—CH$_2$— wherein p is from 1 to 10 and whereby either or both of the terminal groups of the above chains may be replaced by a carbonyl group when L$^1$ and $^2$ are both —NH— groups, L$^2$ is oxygen, sulphur, nitrogen, —SO—, —SO$_2$— or —NH—, and pharmaceutically acceptable salts, esters derived from alcohols containing from 1 to 10 carbon atoms, and amides derived from ammonia or mono- or di-lower alkyl amines, thereof.

2. A compound according to claim 1, wherein L$^1$ is the same as L$^2$.

3. A compound according to claim 1, wherein the —L$^1$LL$^2$— chain is bonded to the 6,6$^1$ or the 7,7$^1$ positions of the chromone nuclei.

4. A compound according to claim 1, wherein not more than one of P, Q and T, and not more than one of P$^1$, Q$^1$ and T$^1$ is other than hydrogen.

5. A compound according to claim 1, wherein P to T$^1$ are all hydrogen, or one of them is lower alkoxy, L$^1$ and L$^2$ are both —NH— groups, L is a group —CO(CH$_2$)$_m$CO— in which m is from 0 to 10 and the two cromone nuclei are linked through the 6,6$^1$ or 7,7$^1$ positions.

6. A compound according to claim 1 in the form of the sodium salt thereof.

7. A compound according to claim 1 wherein P to T$^1$, which may be the same or different, are hydrogen, chlorine, bromine, iodine, hydroxy, carboxy, alkoxycarbonyl, nitro, amino, alkyl, alkenyl, alkynyl, phenyl, alkoxy, alkenyloxy, alkynyloxy, or alkanoyl groups or such groups carrying as a substituent a halogen, hydroxy, or alkoxy group.

8. A compound according to claim 1, whereinin P to T$^1$, which may be the same or different, are hydrogen, chlorine, bromine, nitro, amino or lower alkyl, alkenyl, alkoxy or alkenyloxy groups containing from 1 to 6 carbon atoms which may carry one of more hydroxy or, lower alkoxy substituents.

9. A compound according to claim 1 which is N,N'-bis(2-carboxychromon-7-yl) adipamide.

10. A compound according to claim 1, wherein the —L$^1$LL$^2$— chain is an —NHCO(CH$_2$)$_m$CONH— chain in which m has a value of from 0 to 10.

11. A compound according to claim 10 which is N,N'-bis(2-carboxychromon-7-yl) oxamide.

12. A compound according to claim 10 which is N,N'-bis(2-carboxychromon-6-yl) succinamide.

13. A compound according to claim 10 which is N,N'-bis(2-carboxychromon-6-yl) adipamide.

14. A compound according to claim 10 which is N,N'-bis(2-carboxychromon-6-yl) sebacamide.

15. A compound according to claim 10 which is N,N'-bis(2-carboxy-7-methoxy chromon-6-yl) sebacamide.

References Cited
UNITED STATES PATENTS
3,484,445  12/1969  Lee et al. _____ 260—345.2 X JOHN M. FORD, Primary Examiner U.S. Cl. X.R.

260—294.8 C, 295 F, 293.58, 268 BC, 340.6, 345.5; 424—283